United States Patent
Oh et al.

(10) Patent No.: US 7,970,906 B2
(45) Date of Patent: Jun. 28, 2011

(54) METHOD AND APPARATUS FOR ALLOCATING RESOURCES IN A WIRELESS COMMUNICATION SYSTEM AND SYSTEM THEREOF

(75) Inventors: Chang-Yoon Oh, Yongin-si (KR); Jae-Jeong Shim, Seongnam-si (KR); Jung-Je Son, Yongin-si (KR); Yeong-Moon Son, Yongin-si (KR); Geun-Hwi Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 12/253,721

(22) Filed: Oct. 17, 2008

(65) Prior Publication Data

US 2009/0043895 A1     Feb. 12, 2009

(30) Foreign Application Priority Data

Oct. 18, 2007 (KR) .................. 10-2007-0105287
Jan. 4, 2008 (KR) .................. 10-2008-0001491
Aug. 20, 2008 (KR) .................. 10-2008-0081602

(51) Int. Cl.
*G06F 15/173* (2006.01)
*H04Q 7/00* (2006.01)
*H04W 72/04* (2009.01)

(52) U.S. Cl. ......... 709/226; 709/224; 370/329; 370/330
(58) Field of Classification Search .................. 370/310, 370/329, 330, 437; 455/450; 375/267
See application file for complete search history.

(56) References Cited

U.S. PATENT DOCUMENTS

| | | | | |
|---|---|---|---|---|
| 5,987,032 | A * | 11/1999 | Nadgauda et al. | 370/437 |
| 7,792,533 | B2 * | 9/2010 | Grandblaise et al. | 455/450 |
| 2007/0293231 | A1 * | 12/2007 | So | 455/450 |
| 2008/0037679 | A1 * | 2/2008 | Khan et al. | 375/267 |
| 2008/0151794 | A1 * | 6/2008 | Moilanen | 370/310 |
| 2008/0316966 | A1 * | 12/2008 | Joshi et al. | 370/330 |
| 2009/0022098 | A1 * | 1/2009 | Novak et al. | 370/329 |

* cited by examiner

*Primary Examiner* — Quang N. Nguyen
(74) *Attorney, Agent, or Firm* — Jefferson IP Law, LLP

(57) ABSTRACT

A method is provided for allocating resources by a Base Station (BS) in a wireless communication system. The method includes persistently allocating one or more resource slots among a plurality of resource slots, the persistently allocated one or more resource slots being allocated to corresponding one or more Mobile Stations (MSs), de-allocating at least one persistently allocated resource slot of the one or more persistently allocated resource slots, determining whether a hole is created due to the de-allocation among the one or more persistently allocated resource slots not de-allocated, and shifting a location of at least one of the one or more non-de-allocated persistently allocated resource slots when it is determined that the hole is created due to the de-allocation.

30 Claims, 10 Drawing Sheets

METHOD AND APPARATUS FOR ALLOCATING RESOURCES IN A WIRELESS COMMUNICATION SYSTEM AND SYSTEM THEREOF

PRIORITY

This application claims the benefit under 35 U.S.C. §119(a) of a Korean patent application filed in the Korean Intellectual Property Office on Oct. 18, 2007 and assigned Serial No. 2007-105287, a Korean patent application filed in the Korean Intellectual Property Office on Jan. 4, 2008 and assigned Serial No. 2008-1491, and a Korean patent application filed in the Korean Intellectual Property Office on Aug. 20, 2008 and assigned Serial No. 2008-81602, the entire disclosure of each of which are hereby incorporated by reference.

BACKGROUND OF THE INVENTION

1. Field of the Invention The present invention relates to a method and apparatus for allocating resources in a wireless communication system and a system thereof. More particularly, the present invention relates to a method and apparatus for allocating resources in a wireless communication system using a persistent resource allocation scheme and a system thereof.

2. Description of the Related Art

Next-generation communication systems are being developed to provide various high-speed, high-capacity services to Mobile Stations (MSs). A next-generation communication system includes an Institute of Electrical and Electronics Engineers (IEEE) 802.16 communication system and a Mobile Worldwide Interoperability for Microwave Access (WiMAX) communication system. The Mobile WiMAX communication system is a communication system based on the IEEE 802.16 communication system.

With reference to FIG. 1, a description will now be made of a frame structure in an IEEE 802.16 communication system.

FIG. 1 is a diagram illustrating a frame structure in an IEEE 802.16 communication system.

As illustrated in FIG. 1, a frame 111 includes a DownLink (DL) subframe 113, a Transmit/Receive Transition Gap (TTG) interval 115, an UpLink (UL) subframe 117, and a Receive/Transmit Transition Gap (RTG) interval 119. A length of the frame 111 is $t_{frame}$, a length of the DL subframe 113 is $t_{DL\_subframe}$, a length of the TTG interval 115 is $t_{TTG}$, a length of the UL subframe 117 is $t_{UL\_subframe}$, and a length of the RTG interval 119 is $t_{RTG}$.

The DL subframe 113 includes a preamble region 121, a Frame Control Header (FCH) region 123, a DL_MAP region 125, a UL_MAP region 127, and a DL data burst region 129. A synchronization signal, e.g., preamble signal, for synchronization acquisition between a signal transmission apparatus, e.g., a Base Station (BS), and a signal reception apparatus, e.g., a MS, is transmitted during the preamble region 121. Basic information on subchannels, ranging and a modulation scheme is transmitted during the FCH region 123. A DL_MAP message is transmitted during the DL_MAP region 125, and a UL_MAP message is transmitted during the UL_MAP region 127. The DL_MAP message includes a DL_MAP Information Element (IE) indicating information about the DL data burst region 129. The UL_MAP message includes a UL_MAP IE indicating information about a UL data burst region 133. DL data bursts are transmitted during the DL data burst region 129.

The UL subframe 117 includes a control region 131 and the UL data burst region 133. Although not separately illustrated in FIG. 1, the control region 131 includes a ranging region, a Channel Quality Indicator Channel (CQICH) region, an ACKnowledgment (ACK) channel (ACKCH) region, and a sounding region. The ranging region is a region during which an MS transmits a ranging code, and when performing an initial network entry operation, performing a handoff operation or requesting resource allocation, an MS transmits a ranging code through the ranging region according to its purpose. The CQICH region indicates a region during which an MS transmits its CQI, and the ACKCH region indicates a region during which an MS transmits its success/failure in reception of DL data bursts. A sounding signal for allowing an MS to perform UL channel estimation is transmitted during the sounding region.

As described in FIG. 1, the IEEE 802.16 communication system allocates resources to an MS to exchange DL and UL traffic data with it, and provides the resource allocation information to the MS using a resource allocation message. The resource allocation message can be a DL_MAP message or a UL_MAP message. A transmission period of the DL_MAP message and UL_MAP message is a frame period.

However, in the service where traffic data is periodically transmitted to an MS, for example, in Voice over Internet Protocol (VoIP) service, BSs transmitting a resource allocation message at every frame to transmit resource allocation information for the resources allocated to the corresponding MS may cause an unnecessary waste in resources. Therefore, when providing a service having a periodic traffic transmission period like the VoIP service, it is preferable to persistently allocate resources for the corresponding MS. A scheme of persistently allocating resources for a particular MS is referred to as a 'persistent resource allocation scheme'. For convenience, the persistent resource allocation scheme will be referred to herein as a 'circuit-mode resource allocation scheme'.

When using the circuit-mode resource allocation scheme, an MS, once it is allocated resources from a BS, can persistently use the allocated resources without receiving the resource allocation message at every frame. Of course, when the resource allocation for the MS is changed or released, the BS can notify the MS of the change and release of the resource allocation using a separate resource allocation message. As a result, when using the circuit-mode resource allocation scheme, the BS has no need to transmit the resource allocation message at every frame, thereby making it possible to prevent the waste of resources caused by the transmission of the resource allocation message.

With reference to FIG. 2, a description will now be made of a resource allocation method based on a circuit-mode resource allocation scheme in an IEEE 802.16 communication system.

FIG. 2 is a diagram schematically illustrating a resource allocation method based on a circuit-mode resource allocation scheme in an IEEE 802.16 communication system.

Before a description of FIG. 2 is given, it should be noted that the IEEE communication system uses two resource allocation schemes, namely a packet-mode resource allocation scheme and a circuit-mode resource allocation scheme. Referring to FIG. 2, both a resource allocation method based on the packet-mode resource allocation scheme and a resource allocation method based on the circuit-mode resource allocation scheme are illustrated. For convenience, however, a description of the resource allocation method based on the packet-mode resource allocation scheme will be omitted herein. For convenience, resources allocated using the circuit-mode resource allocation scheme will be referred to as 'circuit-mode resources'.

The slot numbers referred to herein and illustrated in FIGS. 2 and 3 are numbered separately for each of the packet-mode resource allocation scheme and the circuit-mode resource allocation scheme in order to simplify the explanation. The slot numbers for the packet-mode resource allocation scheme are numbered in the same direction as the resource allocation beginning with the first slot used for the packet-mode resource allocation scheme. The slot numbers for the circuit-mode resource allocation scheme are numbered in the opposite direction to the resource allocation beginning with the last slot used for the packet-mode resource allocation scheme. The slot numbers used herein are merely for the purpose of explanation and any other slot numbering scheme may equally be used, such as numbering all of the slots of a subframe. Further, the direction of the resource allocation is merely an example, as at least one of the packet-mode resource allocation scheme and circuit-mode resource allocation scheme may employ a resource allocation in a direction opposite to that described herein.

Referring to FIG. 2, when resources are allocated for UL data bursts included in a UL subframe using the circuit-mode resource allocation scheme, UL resources are allocated slot by slot beginning from a start offset. The start offset indicates a location from which the BS starts allocating UL resources using the circuit-mode resource allocation scheme, and a slot #10 assumed to be the start offset in FIG. 2. A detailed description of the start offset will be given below.

For example, in FIG. 2, a circuit-mode resource #1 includes 2 slots in the forward direction from slot #10, which in this example is the start offset, a circuit-mode resource #2 includes 2 slots in the forward direction from a slot #8, which is the next slot of the slots included in the circuit-mode resource #1, and a circuit-mode resource #3 includes 6 slots in the forward direction from a slot #6, which is the next slot of the slots included in the circuit-mode resource #2.

However, the use of the circuit-mode resource allocation scheme described in FIG. 2 may cause a reduction in resource efficiency, which will be described with reference to FIG. 3.

FIG. 3 is a diagram illustrating a case where a circuit-mode resource is de-allocated in an IEEE 802.16 communication system.

Referring to FIG. 3, it is assumed that the circuit-mode resource #2 among the 3 circuit-mode resources allocated in FIG. 2 is de-allocated. It is also assumed that after the circuit-mode resource #2 is de-allocated, a circuit-mode resource #4, or a new circuit-mode resource, may be allocated. The number of slots included in the circuit-mode resource #4 is assumed to be 4. In this case, the number of slots included in the circuit-mode resource #4 exceeds the number 2 of slots included in the de-allocated circuit-mode resource #2. Therefore, the circuit-mode resource #4 cannot use the slots which were included in the circuit-mode resource #2, and should therefore include new slots following the circuit-mode resource #3 that as illustrated in FIG. 3 would comprise larger slot numbers than the start offset. The slots included in the circuit-mode resource #4 include 4 slots in the forward direction from a slot #14, which is the new start offset. As a result, the 2 slots of a slot #8 and a slot #7, which were included in the de-allocated circuit-mode resource #2, become a hole, and the hole is an unavailable resource.

As described in FIG. 3, the use of the circuit-mode resource allocation scheme may cause creation of the hole, impeding continuity of resource allocation. The creation of the hole reduces the resource efficiency, resulting in a decrease in efficiency of the IEEE 802.16 communication system.

SUMMARY OF THE INVENTION

An aspect of the present invention is to address at least the above-mentioned problems and/or disadvantages and to provide at least the advantages described below. Accordingly, an aspect of the present invention is to provide a method and apparatus for allocating resources in a wireless communication system, and a system thereof.

Another aspect of the present invention is to provide a method and apparatus for allocating resources to prevent the creation of a hole when a circuit-mode resource allocation scheme is used in a wireless communication system, and a system thereof.

According to another aspect of the present invention, a Base Station (BS) apparatus in a wireless communication system is provided. The apparatus includes a controller for generating a resource allocation message including a resource move indicator indicating whether it is possible to shift at least one persistently allocated resource slot of one or more persistently allocated resource slots to persistently allocate at least one resource slot among a plurality of resource slots to corresponding one or more Mobile Stations (MSs), and when at least one persistently allocated resource slot of the one or more persistently allocated resource slots is de-allocated, for generating a message including information on the at least one de-allocated resource slot and the resource move indicator, and a transmitter for transmitting the resource allocation message and the message to at least one MS.

According to yet another aspect of the present invention, a Mobile Station (MS) apparatus in a wireless communication system is provided. The apparatus includes a receiver for receiving a resource allocation message including a resource move indicator indicating whether it is possible to shift at least one persistently allocated resource slot of one or more persistently allocated resource slots to persistently allocate at least one resource slot among a plurality of resource slots, and when at least one persistently allocated resource slot of the one or more persistently allocated resource slots is de-allocated, for receiving a message including information on the at least one de-allocated resource slot and the resource move indicator.

According to still another aspect of the present invention, a wireless communication system is provided. The system includes a Base Station (BS) for transmitting a resource allocation message including a resource move indicator indicating whether it is possible to shift at least one persistently allocated resource slot of one or more persistently allocated resource slots to persistently allocate at least one resource slot among a plurality of resource slots to corresponding one or more Mobile Stations (MSs), and when at least one persistently allocated resource slot of the one or more persistently allocated resource slots is de-allocated, for transmitting a message including information on the at least one de-allocated resource slot and the resource move indicator, to the one or more MSs, and the one or more MSs for receiving the resource allocation message and the message.

According to still another aspect of the present invention, a method for allocating resources by a Base Station (BS) in a wireless communication system is provided. The method includes transmitting a resource allocation message including a resource move indicator indicating whether it is possible to shift at least one persistently allocated resource slot of one or more persistently allocated resource slots to persistently allocate at least one resource slot among a plurality of resource slots to corresponding one or more Mobile Stations (MSs), and when at least one persistently allocated resource slot of the one or more persistently allocated resource slots is de-allocated, transmitting a message including information on the at least one de-allocated resource slot and the resource move indicator, to at least one MS.

According to still another aspect of the present invention, a method for allocating resources by a Mobile Station (MS) in a wireless communication system is provided. The method includes receiving a resource allocation message including a resource move indicator indicating whether it is possible to shift at least one persistently allocated resource slot of one or more persistently allocated resource slots to persistently allocate at least one resource slot among a plurality of resource slots, and when at least one persistently allocated resource slot of the one or more persistently allocated resource slots is de-allocated, receiving a message including information on the at least one de-allocated resource slot and the resource move indicator.

According to still another aspect of the present invention, a method for allocating resources in a wireless communication system is provided. The method includes transmitting, by a Base Station (BS), a resource allocation message including a resource move indicator indicating whether it is possible to shift at least one persistently allocated resource slot of one or more persistently allocated resource slots to persistently allocate at least one resource slot among a plurality of resource slots to corresponding one or more Mobile Stations (MSs), receiving, by the corresponding one or more MSs, the resource allocation message, when at least one persistently allocated resource slot of the one or more persistently allocated resource slots is de-allocated, transmitting, by the BS, a message including information on the at least one de-allocated resource slot and the resource move indicator, to at least one MS, and receiving, by the at least one MS, the message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Figure 1:
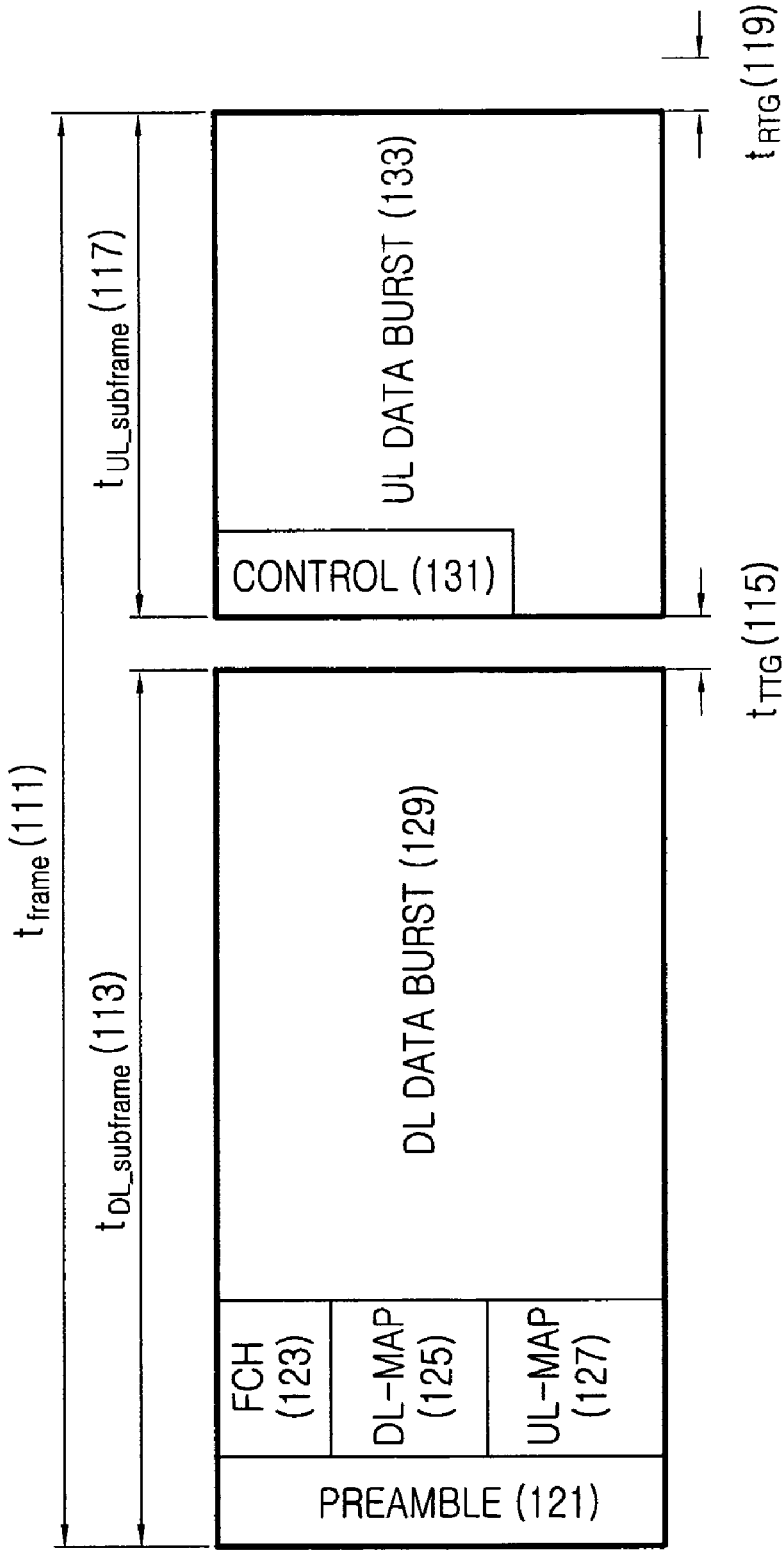
FIG. 1 is a diagram illustrating a frame structure in an IEEE 802.16 communication system.
Figure 2:
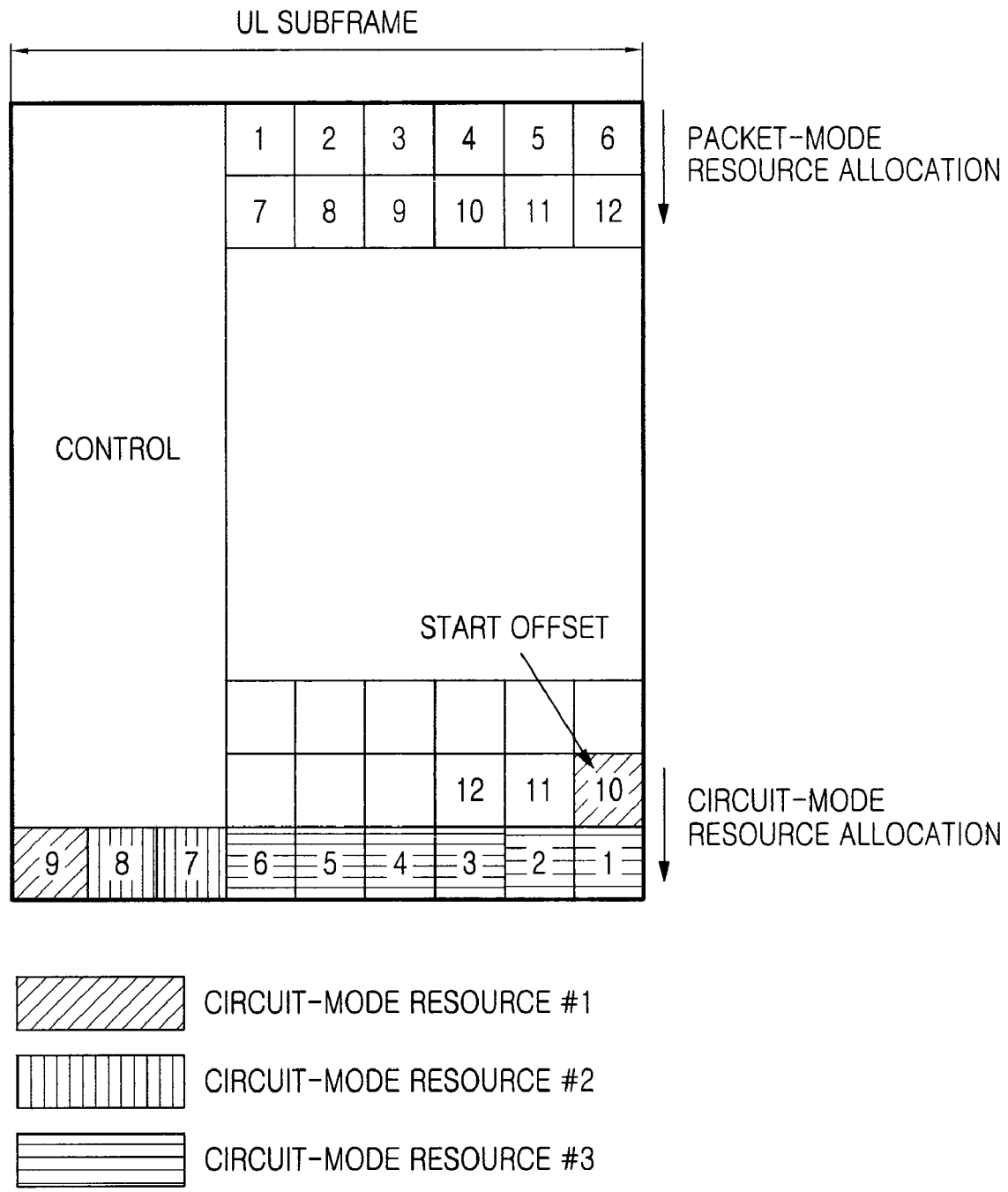
FIG. 2 is a diagram schematically illustrating a resource allocation method based on a circuit-mode resource allocation scheme in an IEEE 802.16 communication system.
Figure 3:
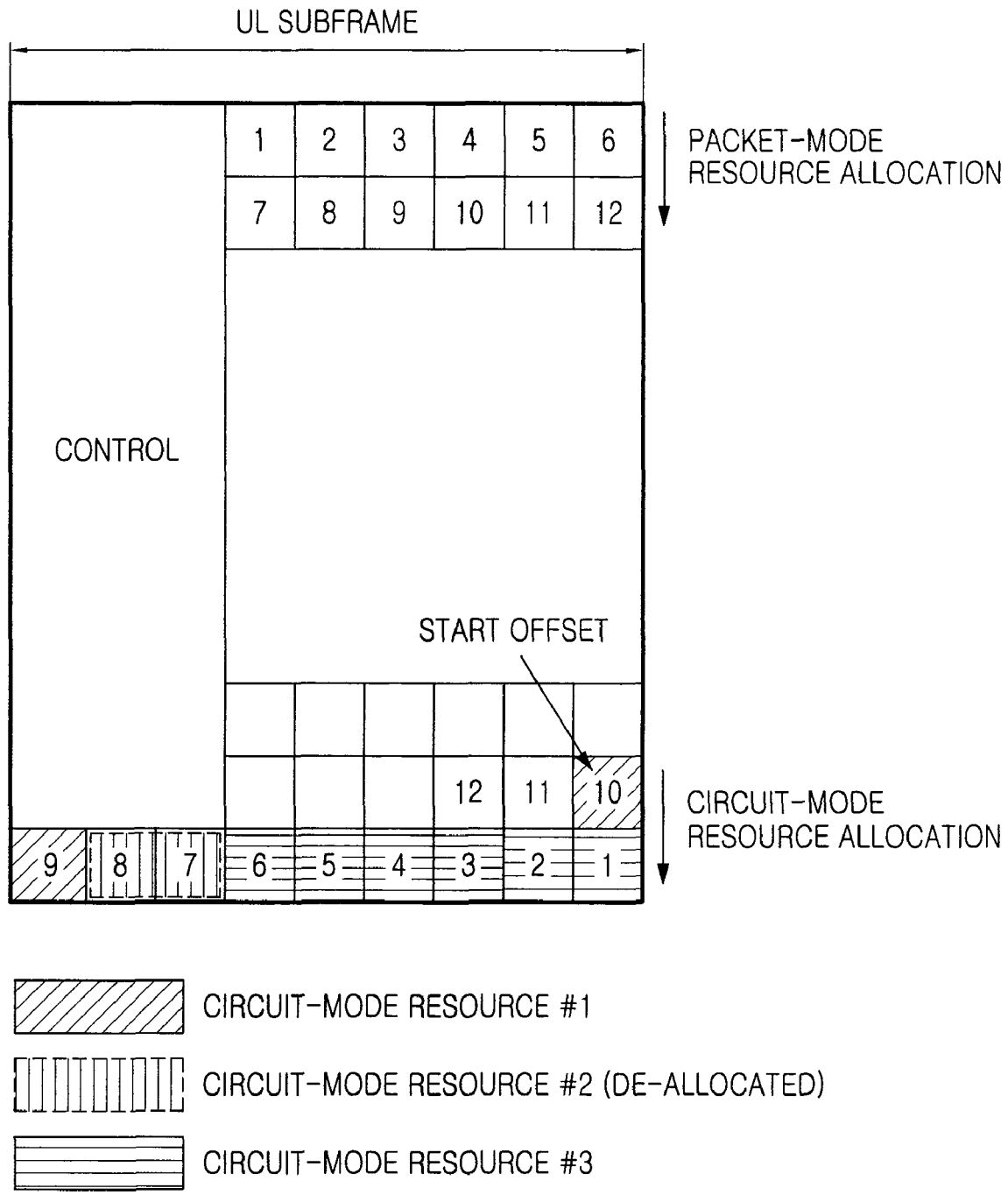
FIG. 3 is a diagram illustrating a case where a circuit-mode resource is de-allocated in an IEEE 802.16 communication system.

Therefore, a need exists for an improved image forming apparatus capable of double-sided printing with one printing module.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method and apparatus for allocating resources in a wireless communication system, and a system thereof. Further, exemplary embodiments of the present invention provide a resource allocation method and apparatus for increasing resource efficiency by allocating resources to prevent creation of a hole(s) when a persistent resource allocation scheme is used as a resource allocation scheme in a wireless communication system, and a system thereof. For convenience, the persistent resource allocation scheme will be referred to as a 'circuit-mode resource allocation scheme'. Although an Institute of Electrical and Electronics Engineers (IEEE) 802.16 communication system will be described herein as an example of a wireless communication system, the resource allocation method and apparatus and a system thereof, proposed by exemplary embodiments of the present invention, can be used not only in the IEEE 802.16 communication system, but also in other wireless communication systems such as a Mobile Worldwide Interoperability for Microwave Access (WiMAX) communication system.

The slot numbers referred to herein and illustrated in FIGS. 4-8 are numbered separately for each of the packet-mode resource allocation scheme and the circuit-mode resource allocation scheme in order to simplify the explanation. The slot numbers for the packet-mode resource allocation scheme are numbered in the same direction as the resource allocation beginning with the first slot used for the packet-mode resource allocation scheme. The slot numbers for the circuit-mode resource allocation scheme are numbered in the opposite direction to the resource allocation beginning with the last slot used for the packet-mode resource allocation scheme. The slot numbers used herein are merely for the purpose of explanation and any other slot numbering scheme may equally be used, such as numbering all of the slots of a subframe. Further, the direction of the resource allocation is merely an example, as at least one of the packet-mode resource allocation scheme and circuit-mode resource allocation scheme may employ a resource allocation in a direction opposite to that described herein.

Figure 4:
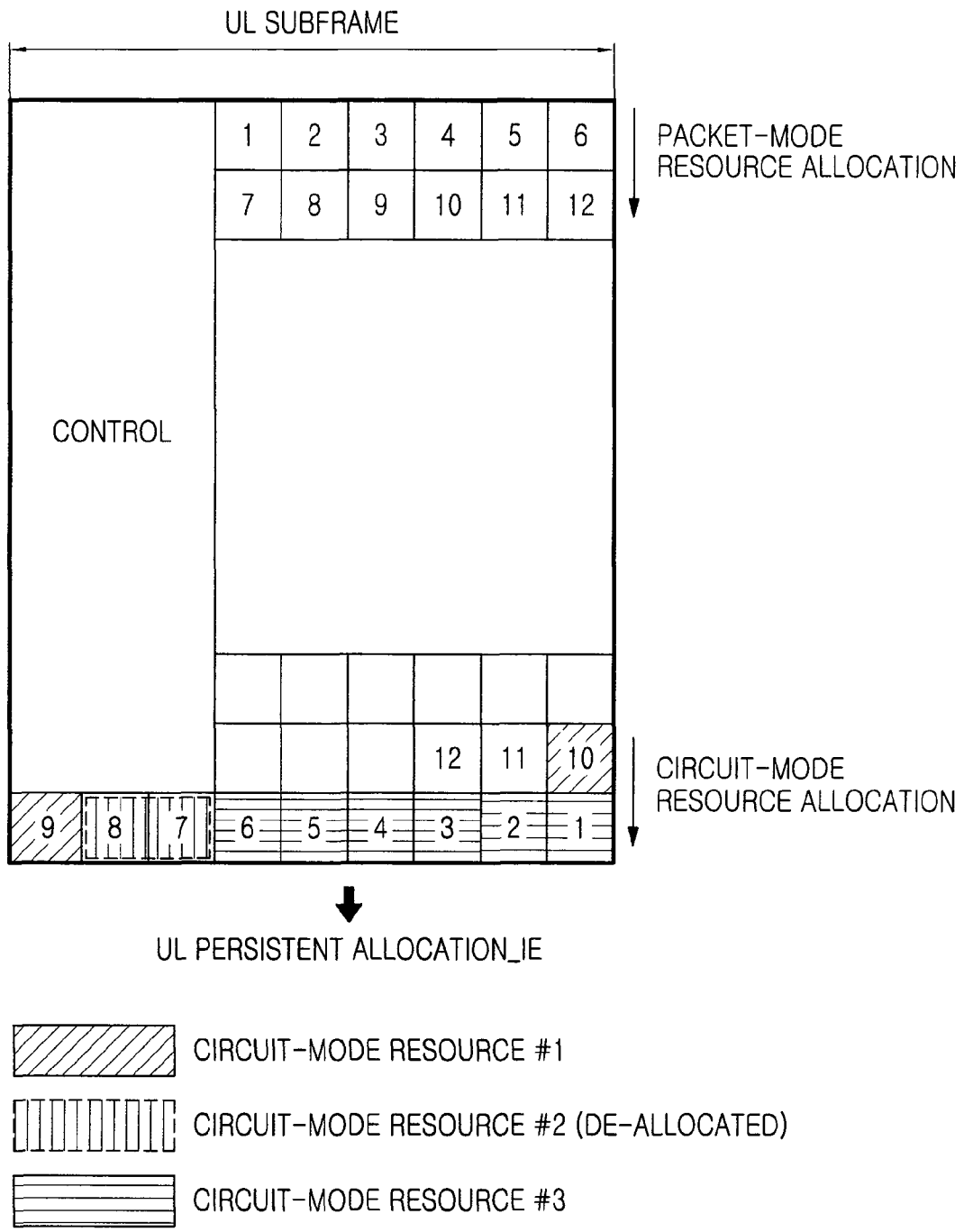
FIG. 4 is a diagram schematically illustrating an example of a resource allocation method based on a circuit-mode resource allocation scheme in an IEEE 802.16 communication system according to an exemplary embodiment of the present invention.

FIG. 4 is a diagram schematically illustrating a resource allocation method based on a circuit-mode resource allocation scheme in an IEEE 802.16 communication system according to an exemplary embodiment of the present invention.

Before a description of FIG. 4 is given, it should be noted that the IEEE communication system uses two resource allocation schemes, namely a packet-mode resource allocation scheme and a circuit-mode resource allocation scheme. Referring to FIG. 4, both a resource allocation method based on the packet-mode resource allocation scheme and a resource allocation method based on the circuit-mode resource allocation scheme are illustrated. For convenience, however, a description of the resource allocation method based on the packet-mode resource allocation scheme will be omitted herein. For convenience, resources allocated using the circuit-mode resource allocation scheme will be referred to as 'circuit-mode resources', and the minimum allocation unit of resources allocated using the circuit-mode resource allocation scheme can be referred to as a slot.

Referring to FIG. 4, it will be assumed that a total of 2 circuit-mode resources, i.e., a circuit-mode resource #1 and a circuit-mode resource #3, are allocated and one circuit-mode resource, i.e., a circuit-mode resource #2, is de-allocated in a UpLink (UL) data burst region included in a UL subframe. Referring to FIG. 4, a start offset is slot #10, and the start offset indicates a location from which a BS starts allocating UL resources using the circuit-mode resource allocation scheme. A detailed description of the start offset will be given below. When resources are allocated using the circuit-mode resource allocation scheme as illustrated in FIG. 4, slots included in the de-allocated resource become a hole, and the hole becomes unavailable resources, causing a reduction in the resource efficiency.

Therefore, exemplary embodiments of the present invention newly propose a UL circuit-mode resource allocation message, i.e., UL Persistent Allocation_Information Element (UL Persistent Allocation_IE), including a Release Resource Move indicator indicating a release of resource allocation, in order to use the hole. That is, exemplary embodiments of the present invention propose a method in which, in order to use the hole, a BS shifts the location of the allocated circuit-mode resource(s) other than the de-allocated circuit-mode resource to prevent the creation of the hole, and informs MSs of the shift before they shift the circuit-mode resource so that the MSs can also shift the circuit-mode resource allocated to themselves.

A format of the UL Persistent Allocation_IE can be made as shown in Table 1.

TABLE 1

| Fields | Description |
| --- | --- |
| UL Persistent Allocation_IE( ) { | |
|     Extended-2 UIUC | |
|     Length | |
|     UL Persistent Allocation IE | 0x01 |
|     Release Resource Move indicator | |
|     Burst level start offset | |
| if (Burst level start offset=1) { | |
|     Start offset | |
|     } | |
| N_Burst | Number of UL circuit-mode control messages |
| For (i=0; i<N_Burst; i++) { | |
| UL Persistent Allocation subburst IE | |
| .. | |
| } | |
|     } | |

Before a description of Table 1 is given, it should be noted that in the IEEE 802.16 communication system, since circuit-mode resources are allocated in the UL in a one-dimensional manner, the UL Persistent Allocation_IE has no need to include a Region Identifier (ID), or region size/location information.

In Table 1, Extended-2 Uplink Interval Usage Code (UIUC) indicates Extended-2 UIUC of the UL Persistent Allocation_IE, and Length indicates a length of the UL Persistent Allocation_IE. Further, Burst level start offset is used for setting a start offset in front of a UL Persistent Allocation subburst IE in order to express the subburst to be allocated next, in duration. That is, Burst level start offset indicates if the UL Persistent Allocation_IE includes a Start offset of a subburst corresponding to the UL Persistent Allocation subburst IE included in the UL Persistent Allocation_IE. For example, if the Burst level start offset is set to a defined value, for example, 1, it indicates that the UL Persistent Allocation_IE includes a Start offset just after the Burst level start offset.

The Start offset, as described above, indicates a location from which circuit-mode resource allocation is started. Since circuit-mode resources are allocated in the UL in a one-dimensional manner, the Start offset can be represented in a one-dimensional manner, or can be represented using Orthogonal Frequency Division Multiple Access (OFDMA) symbol location and subchannel location. For convenience, it is assumed herein that the start offset is represented by the location of a slot. Unlike the foregoing description, it is also possible to notify of the Start offset by transmitting a UL Allocation start IE before transmitting the UL Persistent Allocation_IE.

When the UL Persistent Allocation_IE includes an enabled Release Resource Move indicator, i.e., when a value of the Release Resource Move indicator is set to a defined value, for example, 1, MSs other than the MS whose resources are actually de-allocated, detect the location of the de-allocated resources using the UL Persistent Allocation subburst IE. In this way, the MSs can detect the location of the resources allocated to themselves. A detailed description thereof will be given below.

When a value of Release Resource Move indicator is set to '1', all MSs determine whether they should shift the location of the circuit-mode resources allocated to themselves using the UL Persistent Allocation subburst IE. If it is determined that the MSs should shift the location of the circuit-mode resources allocated to themselves, and if the resources de-allocated according to the UL Persistent Allocation subburst scheme, de-allocating the circuit-mode resources allocated to the MSs, and changing the circuit-mode resources allocated to the MSs.

A format of the UL Persistent Allocation subburst IE can be made as shown in Table 2. It should be noted in Table 2 that the UL Persistent Allocation subburst IE is written as UL Persistent HARQ chase_Subburst_IE.

TABLE 2

| Fields | Length (bits) | Description |
|---|---|---|
| UL Persistent HARQ chase_Subburst_IE( ) { | | |
|   RCID IE | | |
|   Allocation Flag | | 0: New Resource Assignment |
| | | 1: Resource Release |
|   Dedicated UL Control Indicator | 1 | |
| if (Dedicated UL Control Indicator=1){ | | |
| Dedicated UL Control IE | | |
| } | | |
|   if (burst level start offset=0){ | | |
|     Subburst level start offset | | Start offset for current Subburst, when burst level start offset=1, start offset for each subburst is referred from the end of the previously allocated subburst |
|   } | | |
|   Duration | | Allocation duration |
|     Period | | Allocation Period |
|     Expire | | Allocation Expire |
|   Start ACID | | Start ACID |
| # of ACID | | Number of ACID |
|   UIUC | | |
|   Repetition | | |
|   CQI Report flag | 1 | 1: CQI Report through UL subburst |
| if(CQI Report flag==1){ | | |
| period | | Reporting period |
| Frame offset | | |
| } | | |
|     ACKdisable | 1 | |
|     if (ACKdisable==0){ | | |
| ..DL ACK bitmap index | | |
| } | | |
|   } | | |

IE are located behind the resources allocated to themselves, the MSs shift back the resources allocated to themselves by a size of the de-allocated resources. That is, a UL Persistent Allocation subburst IE targeting another MS is used as resource shift information for the resources allocated to the MS itself, and a description thereof will be given below with reference to FIG. 4.

Assume that in the state where slot #7 and slot #8 are allocated to an MS #1, a BS sets a value of Release Resource Move indicator to '1' in order to de-allocate slot #7 and slot #8, and then transmits a UL Persistent Allocation subburst IE along with the UL Persistent Allocation_IE. In this case, an MS #2 using a slot #9 to slot #10 can detect the de-allocation of slot #7 and slot #8 by receiving the UL Persistent Allocation_IE. Determining that the de-allocated slot #7 and slot #8 are located at slot numbers that are lower than slot numbers used by the MS #2 itself, the MS #2 shifts the location of the its resources by 2 slots which corresponds to a size of the de-allocated resources, and then uses slot #7 to slot #8.

Further, in Table 1, an N_Burst field indicates the number of UL Persistent Allocation subburst IEs included in the UL Persistent Allocation_IE. The UL Persistent Allocation subburst IE is a sub resource allocation message for controlling all circuit-mode resource allocation operations of allocating resources to MSs using the circuit-mode resource allocation In the example of FIG. 4, since resources are allocated for a UL subframe using the circuit-mode resource allocation scheme, a UL Persistent Allocation IE is generated. However, if resources are allocated for a DownLink (DL) subframe using the circuit-mode resource allocation scheme, a DL Persistent Allocation IE rather than the UL Persistent Allocation IE is generated.

Meanwhile, each MS, when circuit-mode resources allocated to the MS itself are located in front of the de-allocated slots, detects the number of de-allocated slots, and shifts the location of slots included in the circuit-mode resource allocated to the MS itself. A description thereof will be given with reference to FIG. 5.

Figure 5:
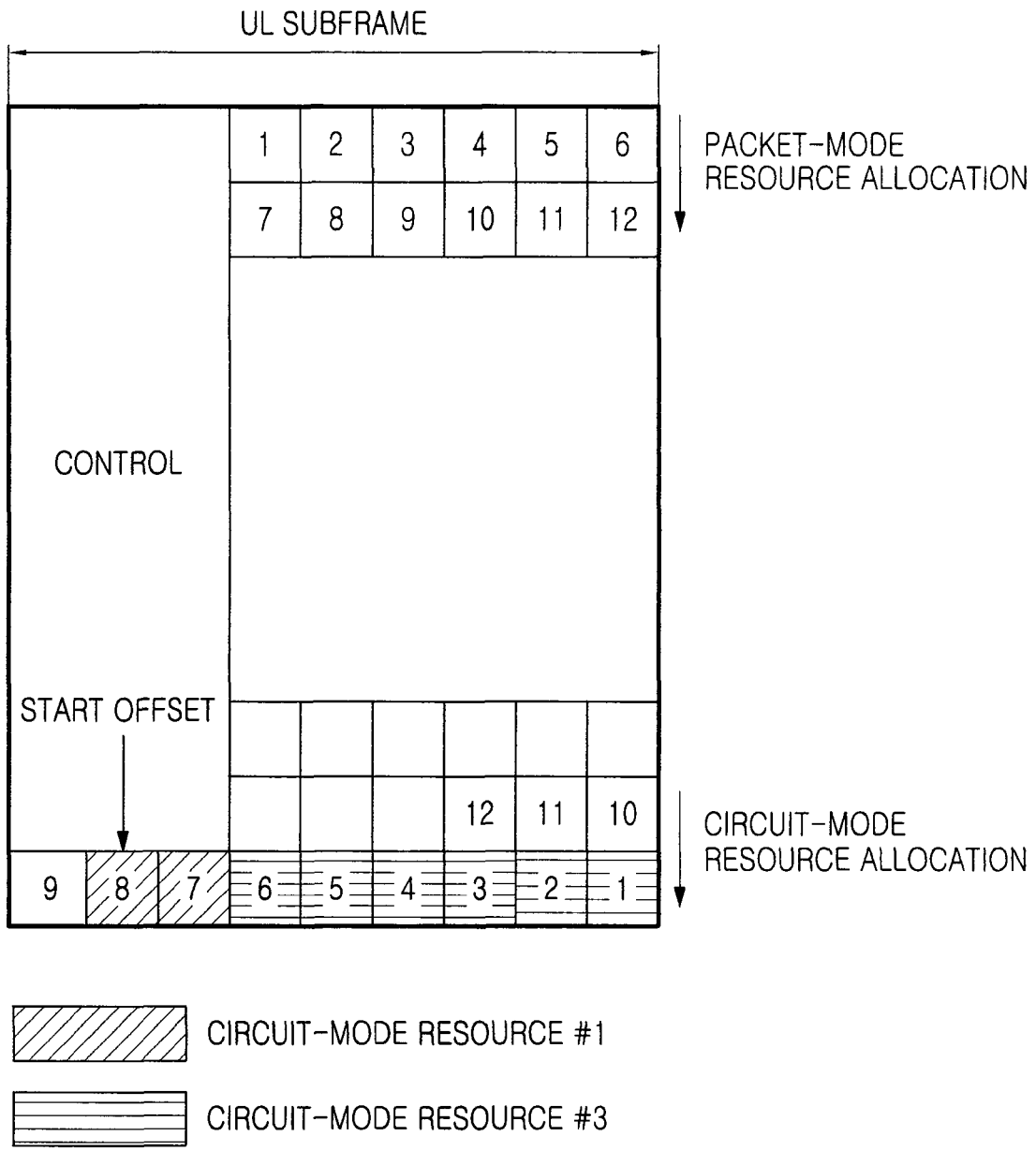
FIG. 5 is a diagram illustrating a method in which MSs, which have received a UL Persistent Allocation_IE, re-set a location of slots included in circuit-mode resources according to the UL Persistent Allocation_IE, according to an exemplary embodiment of the present invention.

FIG. 5 is a diagram illustrating a method in which MSs, which have received a UL Persistent Allocation_IE, re-set a location of slots included in circuit-mode resources according to the UL Persistent Allocation_IE, according to an exemplary embodiment of the present invention.

Referring to FIG. 5, since the UL Persistent Allocation_IE of FIG. 4 indicates de-allocation of the circuit-mode resource #2, the circuit-mode resource #1 located in slots having a slot numbers that are less than slots associated with the de-allocated circuit-mode resource #2 should be shifted by the number 2 of slots included in the de-allocated circuit-mode resource #2. That is, since a start offset of the non-de-allocated circuit-mode resource #1 is less than a start offset of the de-allocated circuit-mode resource #2, the circuit-mode resource #1 is shifted by the number 2 of slots included in the de-allocated circuit-mode resource #2. Therefore, an MS, which is allocated the circuit-mode resource #1, shifts the location of the slots included in the circuit-mode resource #1 so that the circuit-mode resource #1 includes 2 slots in the forward direction from slot #8 rather than slot #10. In this way, since the location of the circuit-mode resource #1 is changed, its start offset is also changed from slot #10 to slot #8. It will be assumed herein that the location change by the UL Persistent Allocation_IE is performed after a defined number of frames have elapsed from the frame where the UL Persistent Allocation_IE was transmitted.

Meanwhile, as described in FIG. 5, it will be assumed that after the de-allocated circuit-mode resources are used, a circuit-mode resource #4, or a new circuit-mode resource, may be allocated. The number of slots included in the circuit-mode resource #4 is assumed to be 4. In this case, since the circuit-mode resource #4 is a new circuit-mode resource that is different from the previously allocated circuit-mode resources, the BS can notify of the start offset and the slot length to the MS using a resource allocation message. A description thereof will be given with reference to FIG. 6.

Figure 6:
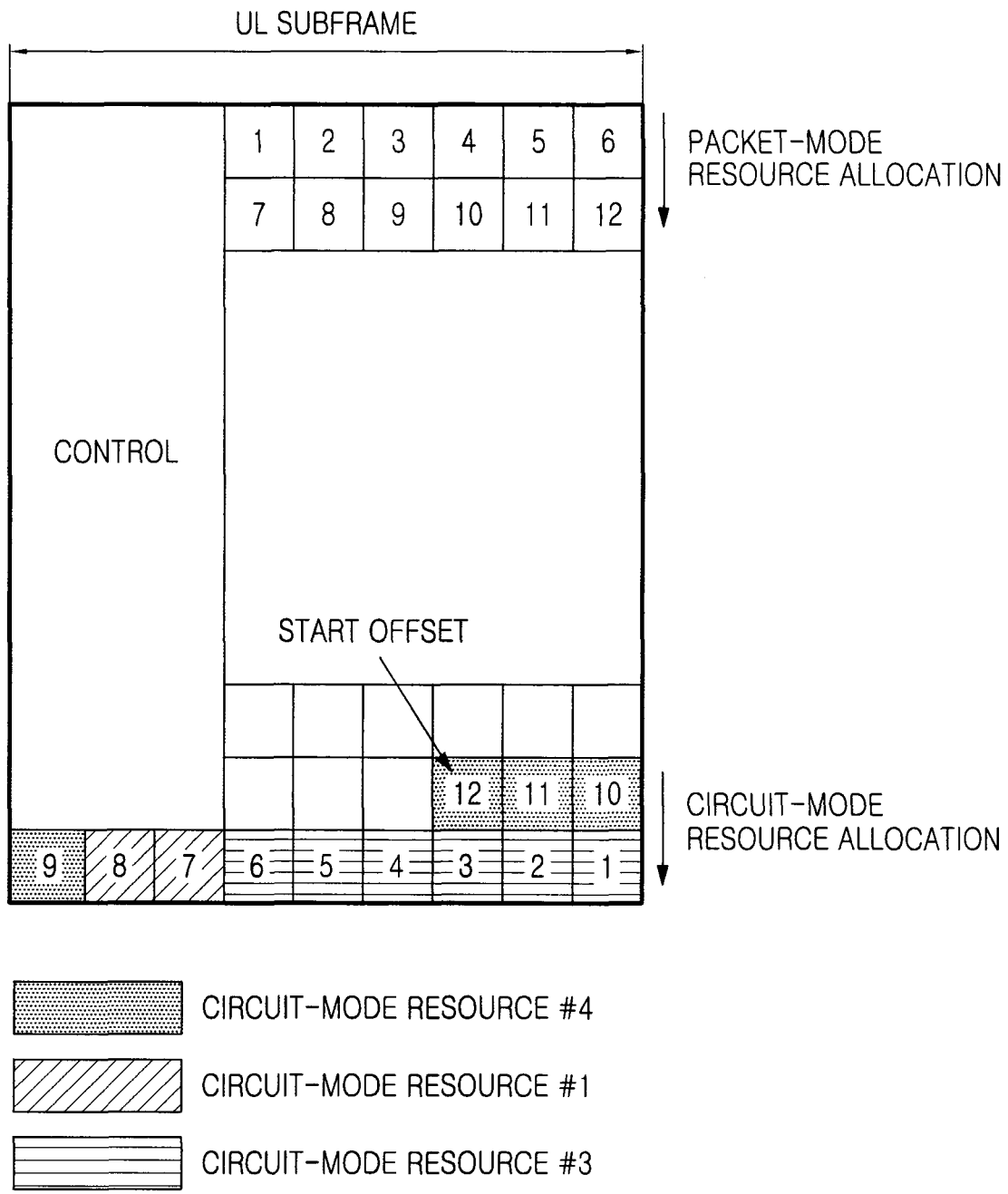
FIG. 6 is a diagram illustrating a method in which MSs, which have received a UL Persistent Allocation_IE, re-set a location of slots included in a circuit-mode resource according to the UL Persistent Allocation_IE, and then allocate new circuit-mode resources, according to an exemplary embodiment of the present invention.

FIG. 6 is a diagram illustrating a method in which MSs, which have received a UL Persistent Allocation_IE, re-set a location of slots included in circuit-mode resources according to the UL Persistent Allocation_IE, and then allocate new circuit-mode resources, according to an exemplary embodiment of the present invention.

As shown in FIG. 6, a BS can allocate the new circuit-mode resource #4 by setting a start offset to a slot #12 and transmitting a length 4 of the circuit-mode resource #4 along with information on the set start offset.

With reference to FIGS. 4 to 6, the resource allocation method based on the circuit-mode resource allocation scheme has been described on the assumption that the IEEE 802.16 communication system first allocates packet-mode resources using the packet-mode resource allocation scheme, and then allocates circuit-mode resources using the circuit-mode resource allocation scheme. However, the same is possible even for the case where the IEEE 802.16 communication system first allocates circuit-mode resources using the circuit-mode resource allocation scheme, and then allocates packet-mode resources using the packet-mode resource allocation scheme. A description thereof will be given below with reference to FIGS. 7 and 8.

Figure 7:
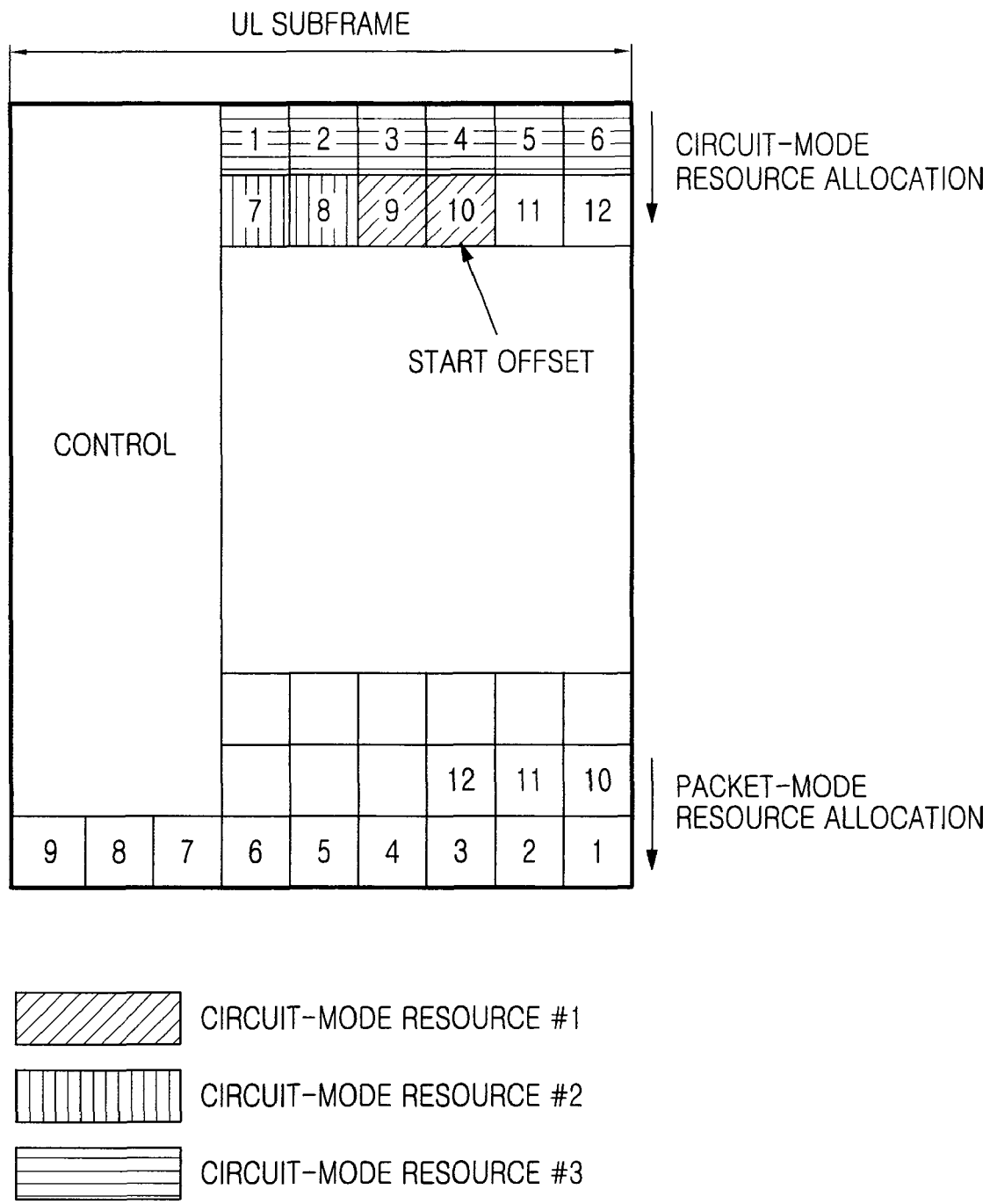
FIG. 7 is a diagram schematically illustrating an example of a resource allocation method based on a circuit-mode resource allocation scheme in an IEEE 802.16 communication system according to an exemplary embodiment of the present invention.

FIG. 7 is a diagram schematically illustrating an example of a resource allocation method based on a circuit-mode resource allocation scheme in an IEEE 802.16 communication system according to an embodiment of the present invention.

Shown in FIG. 7, unlike that in FIG. 4, is a method for first allocating circuit-mode resources using the circuit-mode resource allocation scheme, and then allocating packet-mode resources using the packet-mode resource allocation scheme in the IEEE 802.16 communication system. In this case, the forward direction for allocation of the circuit-mode resources is the opposite direction compared with the case where the packet-mode resource allocation is first performed, and when the circuit-mode resource allocation is first performed, the resources are allocated considering a Modulation and Coding Scheme (MCS) level. That is, an MS that uses the circuit-mode resource #3 among the circuit-mode resources shown in FIG. 7 has the lowest MCS level, and an MS that uses the circuit-mode resource #1 has the highest MCS level.

Figure 8:
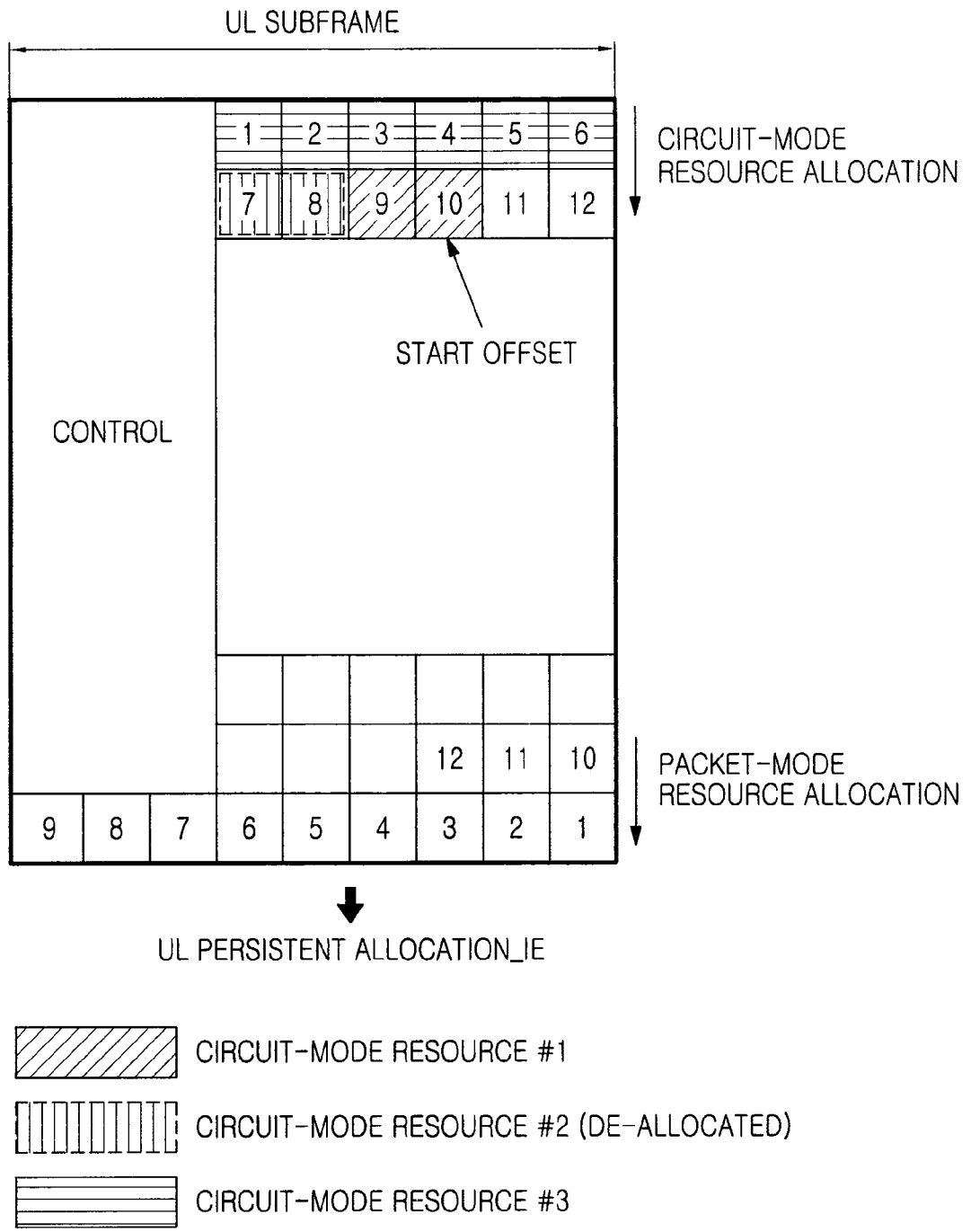
FIG. 8 is a diagram illustrating a case where a circuit-mode resource is de-allocated, according to an exemplary embodiment of the present invention.

FIG. 8 is a diagram illustrating a case where a circuit-mode resource is de-allocated, according to an exemplary embodiment of the present invention.

Referring to FIG. 8, it will be assumed that the circuit-mode resource #2 among the 3 circuit-mode resources allocated in FIG. 7 is de-allocated. That is, since the circuit-mode resource #3 and the circuit-mode resource #1 are allocated and the circuit-mode resource #2 is de-allocated, the BS generates a UL Persistent Allocation_IE. As illustrated in FIG. 8, the forward direction for allocation of the circuit-mode resources is the opposite direction compared with the case where the packet-mode resource allocation is first performed.

Since FIG. 8 shows de-allocation of the circuit-mode resource #2, the circuit-mode resource #1 having slot numbers greater than the slot numbers associated with the de-allocated circuit-mode resource #2 should be shifted by the number 2 of slots included in the de-allocated circuit-mode resource #2. Therefore, an MS, which is allocated the circuit-mode resource #1, shifts the location of slots included in the circuit-mode resource #1 so that the circuit-mode resource #1 includes 6 slots in the forward direction from the slot #8 rather than the slot #10. It will be assumed herein that the location change by the UL Persistent Allocation_IE is performed after a defined number of frames have elapsed from the frame where the UL Persistent Allocation_IE was transmitted. In FIG. 8, when the circuit-mode resources allocated to a corresponding MS that correspond to slot numbers that are lower than the slot numbers associated with the de-allocated circuit-mode resource, the corresponding MS uses the intact circuit-mode resource allocated to the MS.

Although the method for preventing the creation of unused resources due to the resource de-allocation has been described for the UL, by way of example, the same can be applied even to the DL. For example, when using Hybrid Automatic Repeat Request (HARQ) in the DL, the BS allocates an HARQ region, and performs one-dimensional resource allocation in the HARQ region, similar to the resource allocation for the UL. That is, the BS allocates resources in the HARQ region in ascending order of their frequency indexes, and when the HARQ region reaches the boundary with another region, the BS increases the time, and allocates the resources beginning at the frequency resource having the minimum frequency index at the increased time resource region. When one-dimensional resource allocation is performed as described above, the foregoing resource allocation method can be applied in the same way.

Figure 9:
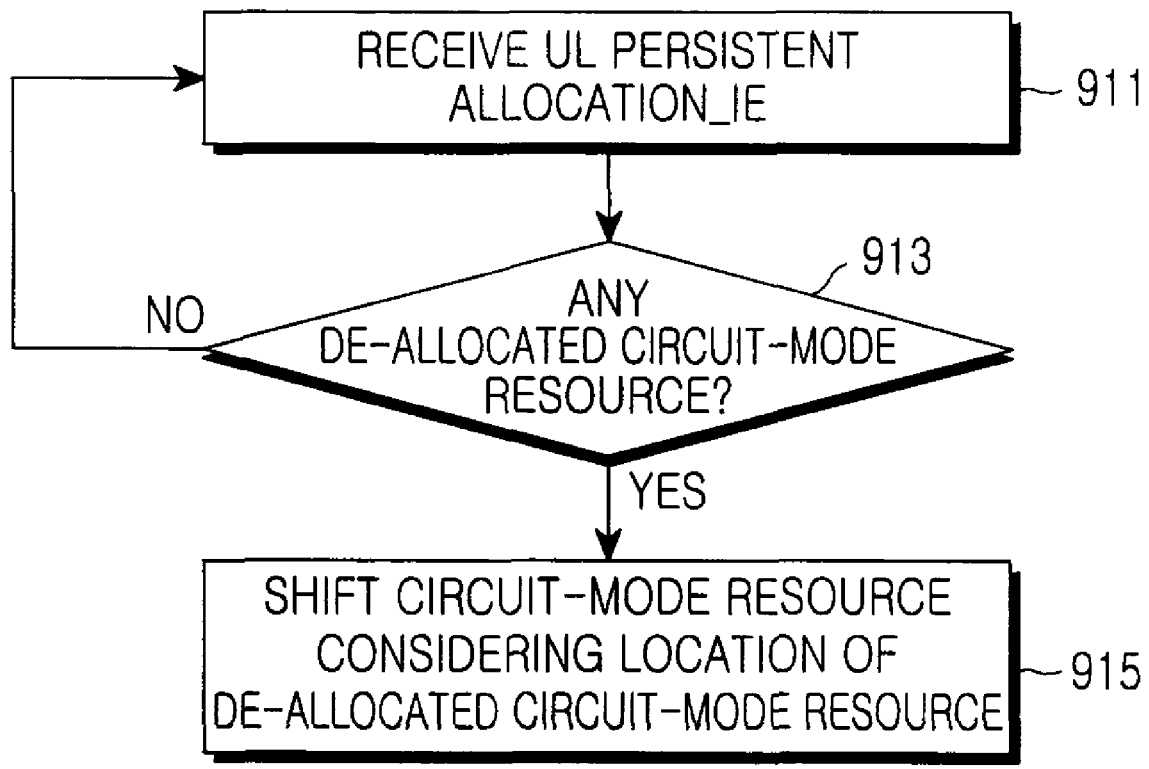
FIG. 9 is a flowchart illustrating a process in which an MS, which has already been allocated circuit-mode resources, changes a location of circuit-mode resources, in an IEEE 802.16 communication system according to an exemplary embodiment of the present invention.

With reference to FIG. 9, a description will now be made of a method in which an MS, which has already been allocated circuit-mode resources, changes a location of the circuit-mode resources, in an IEEE 802.16 communication system according to an exemplary embodiment of the present invention.

FIG. 9 is a flowchart illustrating a process in which an MS, which has already been allocated circuit-mode resources, changes a location of circuit-mode resources, in an IEEE 802.16 communication system according to an exemplary embodiment of the present invention.

Referring to FIG. 9, in step 911, an MS, which has been allocated circuit-mode resources, receives a UL Persistent Allocation_IE. If Release Resource Move indicator included in the received Persistent Allocation_IE is enabled, the MS determines in step 913 if there is any de-allocated circuit-mode resource depending on a UL Persistent Allocation sub-burst IE included in the UL Persistent Allocation_IE. If it is determined that there are any de-allocated circuit-mode resources, the MS proceeds to step 915 where the MS changes the location of the circuit-mode resources allocated to the MS taking the location of the de-allocated circuit-mode resources into consideration.

Figure 10:
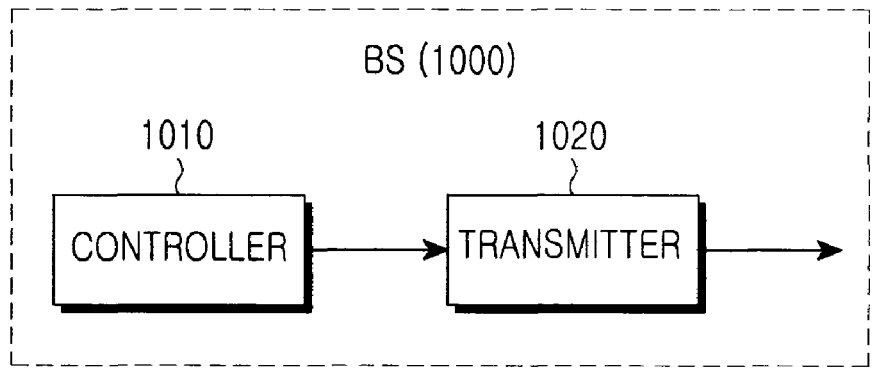
FIG. 10 is a diagram illustrating an internal structure of a BS apparatus in an IEEE 802.16 communication system according to an exemplary embodiment of the present invention.

With reference to FIG. 10, a description will now be made of an internal structure of a BS apparatus in an IEEE 802.16 communication system according to an exemplary embodiment of the present invention.

FIG. 10 is a diagram illustrating an internal structure of a BS apparatus in an IEEE 802.16 communication system according to an exemplary embodiment of the present invention.

Referring to FIG. 10, a BS apparatus 1000 includes a controller 1010 and a transmitter 1020. The controller 1010 allocates resources using the circuit-mode resource allocation scheme to prevent an creation of a hole, and generates resource allocation information for the allocated resources. A resource allocation operation of the controller 1010 has been described with reference to FIGS. 4, 6, 7 and 8.

The resource allocation information generated by the controller 1010 is provided to the transmitter 1020, and the transmitter 1020 transmits the generated resource allocation information to MSs. The term 'resource allocation information' as used herein refers to, for example, a UL circuit-mode resource allocation message, and the resource allocation information has been described with reference to Table 1 and Table 2.

Figure 11:
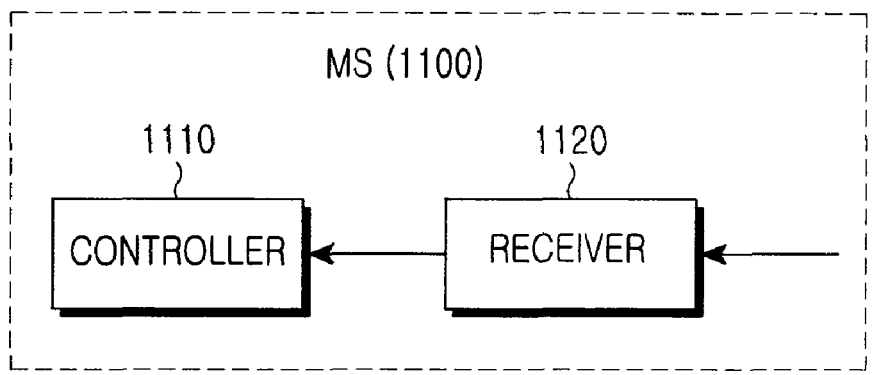
FIG. 11 is a diagram illustrating an internal structure of an MS apparatus in an IEEE 802.16 communication system according to an exemplary embodiment of the present invention.

With reference to FIG. 11, a description will now be made of an internal structure of an MS apparatus in an IEEE 802.16 communication system according to an exemplary embodiment of the present invention.

FIG. 11 is a diagram illustrating an internal structure of an MS apparatus in an IEEE 802.16 communication system according to an exemplary embodiment of the present invention.

Referring to FIG. 11, an MS apparatus 1100 includes a controller 1110 and a receiver 1120. The controller 1110 is allocated resources from a BS using the circuit-mode resource allocation scheme to prevent an creation of a hole. An operation in which the controller 1110 is allocated resources from the BS has been described with reference to FIGS. 5 and 9.

The receiver 1120 receives resource allocation information from the BS. The term 'resource allocation information' as used herein refers to, for example, a UL circuit-mode resource allocation message, and the resource allocation information has been described with reference to Table 1 and Table 2.

As is apparent from the foregoing description, according to exemplary embodiments of the present invention, the communication system can allocate resources using the circuit-mode resource allocation scheme to prevent creation of a hole, thereby contributing to an increase in the resource efficiency.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for allocating resources by a Base Station (BS) in a wireless communication system, the method comprising:
    transmitting a resource allocation message including a resource move indicator indicating whether it is possible to shift at least one persistently allocated resource slot of one or more persistently allocated resource slots to persistently allocate at least one resource slot among a plurality of resource slots to corresponding one or more Mobile Stations (MSs);
    when at least one persistently allocated resource slot of the one or more persistently allocated resource slots is de-allocated, transmitting a message including information on the at least one de-allocated resource slot and the resource move indicator, to at least one MS; and
    when the resource move indicator is enabled, determining whether to shift a location of at least one of the one or more of persistently allocated resource slots,
    wherein the determining of whether to shift the location of the at least one of the one or more persistently allocated resource slots comprises:
        determining whether a hole is created due to the de-allocation among the one or more persistently allocated resource slots not de-allocated; and
        when the hole is created, determining to shift the location of at least one of the one or more non-de-allocated persistently allocated resource slots.

2. The method of claim 1, wherein the determining of whether to shift the location of the at least one of the one or more persistently allocated resource slots comprises:
    comparing a location of the at least one de-allocated resource slot with a location of one or more persistently allocated resource slots of the one or more of persistently allocated resource slots not de-allocated; and
    determining to shift the location of at least one of the one or more non-de-allocated persistently allocated resource slots, based on a comparison between an offset of the at least one de-allocated resource slot and an offset of the at least one of the one or more non-de-allocated persistently allocated resource slots;
    wherein the offsets indicate an allocation start location of a corresponding resource slot.

3. The method of claim 2, further comprising:
    shifting the location of the at least one of the one or more non-de-allocated persistently allocated resource slots according to a number of the at least one de-allocated resource slot, when it is determined to shift the location of the at least one of the one or more non-de-allocated persistently allocated resource slots.

4. The method of claim 1, further comprising:
    shifting the location of the at least one of the one or more non-de-allocated persistently allocated resource slots when it is determined to shift the location of the at least one of the one or more non-de-allocated persistently allocated resource slots.

5. The method of claim 4, wherein the shifting of the location of the at least one of the one or more non-de-allocated persistently allocated resource slots comprises:
    shifting the location of the at least one of the one or more non-de-allocated persistently allocated resource slots to reduce the hole.

6. The method of claim 5, wherein the shifting of the location of the at least one of the one or more non-de-allocated persistently allocated resource slots to reduce the hole comprises:
    shifting the location of the at least one of the one or more non-de-allocated persistently allocated resource slots according to a number of the at least one de-allocated resource slot, or
    shifting the location of the at least one of the one or more non-de-allocated persistently allocated resource slots to prevent the hole from being created among the one or more persistently allocated resource slots.

7. The method of claim 1, wherein the determining of whether the hole is created due to the de-allocation of the at least one de-allocated resource slot among the one or more non-de-allocated persistently allocated resource slots comprises:

determining that the hole is created based on a comparison between an offset of the at least one de-allocated resource slot and an offset of at least one of the one or more non-de-allocated resource slots;

wherein the offsets indicate an allocation start location of a corresponding resource slot.

8. A method for allocating resources by a Mobile Station (MS) in a wireless communication system, the method comprising:

receiving a resource allocation message including a resource move indicator indicating whether it is possible to shift at least one persistently allocated resource slot of one or more persistently allocated resource slots to persistently allocate at least one resource slot among a plurality of resource slots;

when at least one persistently allocated resource slot of the one or more persistently allocated resource slots is de-allocated, receiving a message including information on the at least one de-allocated resource slot and the resource move indicator; and when the resource move indicator is enabled, determining whether to shift a location of at least one resource slot persistently allocated to the MS, wherein the determining of whether to shift the location of the at least one resource slot persistently allocated to the MS comprises:

determining whether a hole is created due to the de-allocation among the one or more persistently allocated resource slots not de-allocated; and when the hole is created, determining to shift the location of at least one of the one or more non-de-allocated persistently allocated resource slots.

9. The method of claim 8, wherein the determining of whether to shift the location of the at least one resource slot persistently allocated to the MS comprises:

comparing a location of the at least one de-allocated resource slot with the location of the at least one persistently allocated resource slot; and determining to shift the location of the at least one persistently allocated resource slot, based on an offset of the at least one de-allocated resource slot compared to an offset of the at least one persistently allocated resource slot;

wherein the offsets indicate an allocation start location of a corresponding resource slot.

10. The method of claim 9, wherein the shifting of the location of the at least one persistently allocated resource slot comprises:

shifting the location of the at least one persistently allocated resource slot according to a number of the at least one de-allocated resource slot.

11. The method of claim 8, wherein the shifting of the location of the at least one persistently allocated resource slot comprises:

shifting the location of the at least one persistently allocated resource slot to reduce the hole.

12. The method of claim 11, wherein the shifting of the location of the at least one persistently allocated resource slot to reduce the hole comprises:

shifting the location of the at least one persistently allocated resource slot according to a number of the at least one de-allocated resource slot, or shifting the location of the at least one persistently allocated resource slot to prevent the hole from being created among the one or more persistently allocated resource slots.

13. The method of claim 8, wherein the determining of whether the hole is created among the one or more persistently allocated resource slots from to the de-allocation comprises:

determining that the hole is created-, based on a comparison between an offset of the at least one de-allocated resource slot and an offset of one or more non-de-allocated resource slots among the one or more persistently allocated resource slots;

wherein the offsets indicate an allocation start location of a corresponding resource slot.

14. A method for allocating resources in a wireless communication system, the method comprising:

transmitting, by a Base Station (BS), a resource allocation message including a resource move indicator indicating whether it is possible to shift at least one persistently allocated resource slot of one or more persistently allocated resource slots to persistently allocate at least one resource slot among a plurality of resource slots to corresponding one or more Mobile Stations (MSs);

receiving, by the corresponding one or more MSs, the resource allocation message;

when at least one persistently allocated resource slot of the one or more persistently allocated resource slots is de-allocated, transmitting, by the BS, a message including information on the at least one de-allocated resource slot and the resource move indicator, to at least one MS;

receiving, by the at least one MS, the message; and determining by the BS, whether to shift a location of at least one of the one or more of persistently allocated resource slots, when the resource move indicator is enabled;

wherein the determining by the BS of whether to shift the location of at least one of the one or more persistently allocated resource slots comprises:

determining whether a hole is created due to the de-allocation among the one or more persistently allocated resource slots not de-allocated; and when the hole is created, determining to shift the location of at least one of the one or more non-de-allocated persistently allocated resource slots.

15. The method of claim 14, wherein the determining by the BS of whether to shift the location of at least one of the one or more persistently allocated resource slots comprises:

comparing, by the BS, a location of the at least one de-allocated resource slot with a location of the one or more persistently allocated resource slots of the one or more of persistently allocated resource slots not de-allocated; and determining by the BS whether to shift the location of the at least one of the one or more non-de-allocated persistently allocated resource slots, based on a relative position of an offset of the at least one de-allocated resource slot compared to an offset of the at least one of the one or more non-de-allocated persistently allocated resource slots;

wherein the offsets indicate an allocation start location of a corresponding resource slot.

16. The method of claim 15, further comprising:

shifting, by the BS, the location of the at least one of the one or more non-de-allocated persistently allocated resource slots according to a number of the at least one de-allocated resource slot, when it is determined to shift the location of the at least one of the one or more non-de-allocated persistently allocated resource slots.

17. The method of claim 14, further comprising:
shifting, by the BS, the location of the at least one of the one or more non-de-allocated persistently allocated resource slots, when it is determined to shift the location of the at least one of the one or more non-de-allocated persistently allocated resource slots.

18. The method of claim 17, wherein the shifting of the location of the at least one of the one or more non-de-allocated persistently allocated resource slots by the BS comprises:
shifting, by the BS, the location of the at least one of the one or more non-de-allocated persistently allocated resource slots to reduce the hole.

19. The method of claim 17, wherein the shifting of the location of the at least one of the one or more non-de-allocated persistently allocated resource slots by the BS to reduce the hole comprises:
shifting, by the BS, the location of the at least one of the one or more non-de-allocated persistently allocated resource slots according to a number of the at least one de-allocated resource slots, or
shifting the location of the at least one of the one or more non-de-allocated persistently allocated resource slots to prevent the hole from being created among the one or more persistently allocated resource slots.

20. The method of claim 14, wherein the determining by the BS of whether the hole is created due to the de-allocation among the one or more persistently allocated resource slots not de-allocated comprises:
determining that the hole occurs, based on a comparison between an offset of the at least one de-allocated resource slot and an offset of at least one of the one or more non-de-allocated resource slots,
wherein the offsets indicate an allocation start location of a corresponding resource slot.

21. The method of claim 14, further comprising:
determining by the MS whether to shift a location of at least one resource slot persistently allocated to the MS, when the resource move indicator is enabled; and
shifting, by the MS, the location of the at least one persistently allocated resource slot, when it is determined to shift the location.

22. The method of claim 21, wherein the determining by the MS of whether to shift the location of the at least one persistently allocated resource slot comprises:
comparing, by the MS, a location of the at least one de-allocated resource slot with the location of the at least one persistently allocated resource slot; and
determining by the MS to shift the location of the at least one persistently allocated resource slot, based on a comparison between an offset of the at least one de-allocated resource slot and an offset of the at least one persistently allocated resource slot;
wherein the offsets indicate an allocation start location of a corresponding resource slot.

23. The method of claim 22, wherein the shifting of the location of the at least one persistently allocated resource slot by the MS comprises:
shifting, by the MS, the location of the at least one persistently allocated resource slot according to a number of the at least one de-allocated resource slot.

24. The method of claim 21, wherein the determining by the MS of whether to shift the location of the at least one persistently allocated resource slot comprises:

determining by the MS whether a hole is created among the one or more persistently allocated resource slots from to the de-allocation; and
determining by the MS to shift the location of the at least one persistently allocated resource slot, if the hole is created.

25. The method of claim 24, wherein the shifting of the location of the at least one persistently allocated resource slot by the MS comprises:
shifting, by the MS, the location of the at least one persistently allocated resource slot to reduce the hole.

26. The method of claim 25, wherein the shifting of the location of the at least one persistently allocated resource slot by the MS to reduce the hole comprises:
shifting, by the MS, the location of the at least one persistently allocated resource slot according to a number of the at least one de-allocated resource slot, or
shifting the location of the at least one persistently allocated resource slot to prevent the hole from being created among the one or more persistently allocated resource slots.

27. The method of claim 24, wherein the determining by the MS of whether the hole is created among the one or more persistently allocated resource slots comprises:
determining by the MS that the hole is created based on a comparison between an offset of the at least one de-allocated resource slot and an offset of one or more non-de-allocated resource slots among the one or more persistently allocated resource slots;
wherein the offsets indicate an allocation start location of a corresponding resource slot.

28. A Base Station (BS) apparatus in a wireless communication system, the apparatus comprising:
at least one Computer Processor Unit (CPU);
a controller for generating a resource allocation message including a resource move indicator indicating whether it is possible to shift at least one persistently allocated resource slot of one or more persistently allocated resource slots to persistently allocate at least one resource slot among a plurality of resource slots to corresponding one or more Mobile Stations (MSs), and when at least one persistently allocated resource slot of the one or more persistently allocated resource slots is de-allocated, for generating a message including information on the at least one de-allocated resource slot and the resource move indicator; and
a transmitter for transmitting the resource allocation message and the message to at least one MS,
wherein, when the resource move indicator is enabled, determining whether to shift a location of at least one of the one or more of persistently allocated resource slots, and
wherein the determining of whether to shift the location of the at least one of the one or more persistently allocated resource slots comprises:
determining whether a hole is created due to the de-allocation among the one or more persistently allocated resource slots not de-allocated; and
when the hole is created, determining to shift the location of at least one of the one or more non-de-allocated persistently allocated resource slots.

29. A Mobile Station (MS) apparatus in a wireless communication system, the apparatus comprising:
at least one Computer Processor Unit (CPU); and
a receiver for receiving a resource allocation message including a resource move indicator indicating whether it is possible to shift at least one persistently allocated resource slot of one or more persistently allocated resource slots to persistently allocate at least one resource slot among a plurality of resource slots, and when at least one persistently allocated resource slot of the one or more persistently allocated resource slots is de-allocated, for receiving a message including information on the at least one de-allocated resource slot and the resource move indicator, wherein, when the resource move indicator is enabled, determining whether to shift a location of at least one resource slot persistently allocated to the MS, and wherein the determining of whether to shift the location of the at least one resource slot persistently allocated to the MS comprises:

determining whether a hole is created due to the de-allocation among the one or more persistently allocated resource slots not de-allocated; and when the hole is created, determining to shift the location of at least one of the one or more non-de-allocated persistently allocated resource slots.

30. A wireless communication system, the system comprising:

a Base Station (BS) for transmitting a resource allocation message including a resource move indicator indicating whether it is possible to shift at least one persistently allocated resource slot of one or more persistently allocated resource slots to persistently allocate at least one resource slot among a plurality of resource slots to corresponding one or more Mobile Stations (MSs), and when at least one persistently allocated resource slot of the one or more persistently allocated resource slots is de-allocated, for transmitting a message including information on the at least one de-allocated resource slot and the resource move indicator, to the one or more MSs; and the one or more MSs for receiving the resource allocation message and the message, wherein the BS determines whether to shift a location of at least one of the one or more of persistently allocated resource slots, when the resource move indicator is enabled, and wherein the determining by the BS of whether to shift the location of at least one of the one or more persistently allocated resource slots comprises:

determining whether a hole is created due to the de-allocation among the one or more persistently allocated resource slots not de-allocated; and when the hole is created, determining to shift the location of at least one of the one or more non-de-allocated persistently allocated resource slots.

* * * * *